United States Patent Office 2,923,674
Patented Feb. 2, 1960

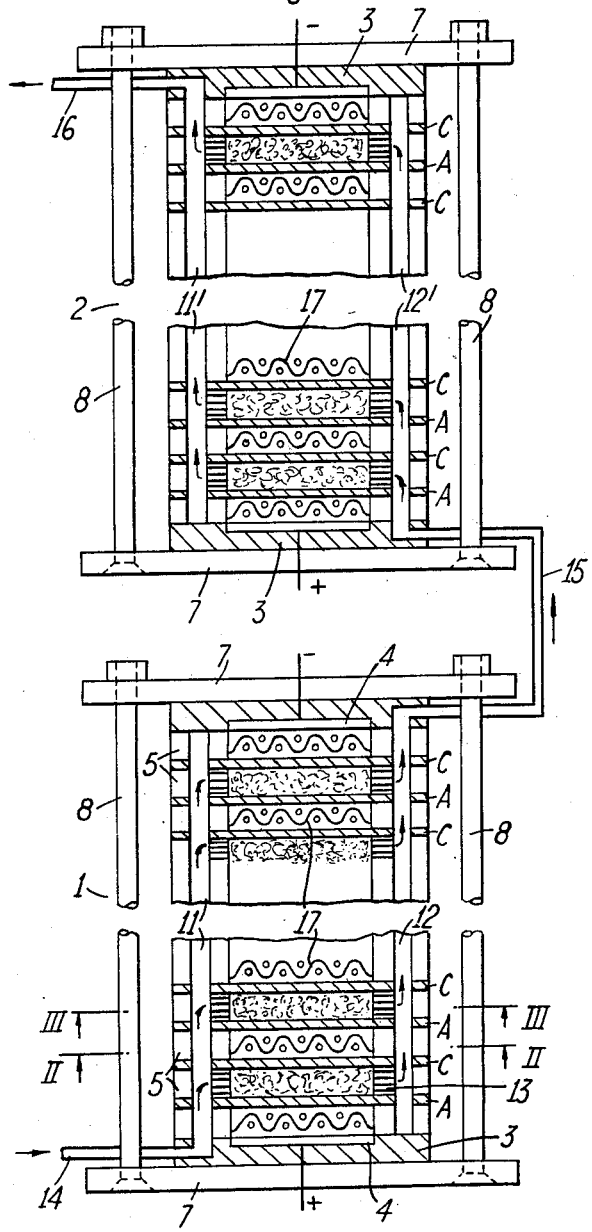

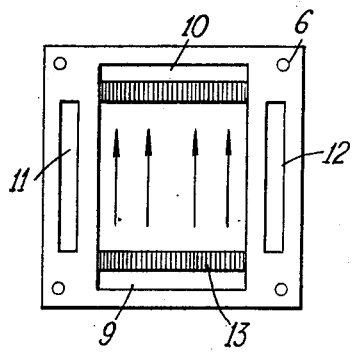
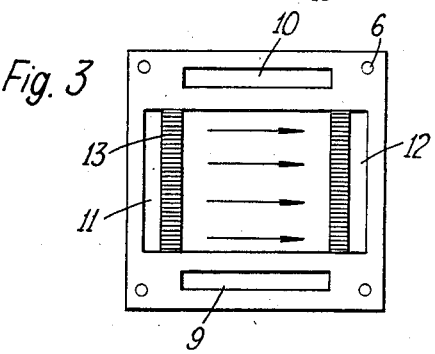
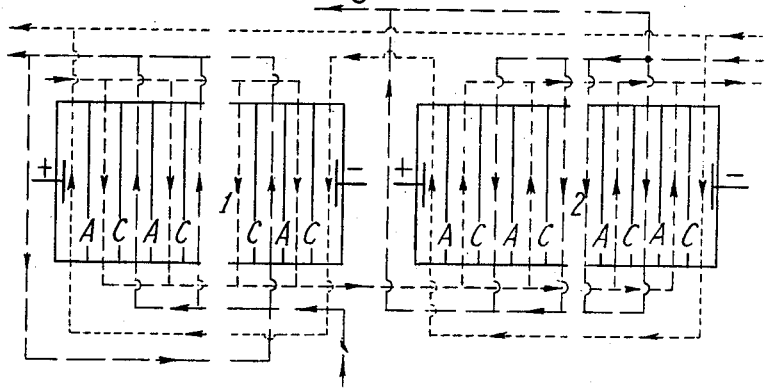
DESALTING STREAM
SALTY STREAM
ELECTRODE STREAM

2,923,674

PROCESS FOR THE REMOVAL OF DISSOLVED SOLIDS FROM LIQUIDS

Theodore Roger Ernest Kressman, Watford, England, assignor to The Permutit Company Limited, London, England, a British company Application February 2, 1959, Serial No. 790,652

Claims priority, application Great Britain February 3, 1958

9 Claims. (Cl. 204—180)

This invention relates to a process for the removal of dissolved solids from liquids.

It is known that if a direct electric current is passed through a solution containing ionically dissociated solids contained in an electrodialytic cell divided into compartments by barriers, each compartment being bounded on one side by a barrier selectively permeable to ions of one sign and on the opposite side by a barrier selectively permeable to ions of the opposite sign, cations and anions will migrate through the barriers selective to them but not through the opposite barriers. Therefore it is possible to deionize the solution in alternate compartments.

It is further known that the electrical conductivity of the cell may be increased by filling the compartments with a mixture of granular cation-exchange and anion-exchange materials.

According to this invention an aqueous solution from which ionically dissociated dissolved solids are to be removed is subjected to electrodialysis successively in two compartments each bounded on the cathode side by a barrier selectively permeable to cations and on the anode side by a barrier selectively permeable to anions, the first compartment being filled with a cation-exchange material, the second compartment being filled with an anion-exchange material and each compartment lying between two others containing an aqueous electrolyte.

In the first compartment through which the solution flows the cations migrate out of the compartment preferentially to the anions and the ionic balance is maintained by preferential migration of hydroxyl ions out of the compartment so that an excess of hydrogen ions remains behind. In the second compartment anions are removed by similar action and are replaced by hydroxyl ions. Thus the total content of dissolved solids is reduced.

The invention is particularly applicable to the demineralisation of water. It is well known that water can be demineralised by passage through a compartment which lies between two other compartments containing water or a salt solution in which the ions driven through the two barriers collect. For ease of reference the compartments receiving the water to be demineralised may be called "desalting" and those on either side "salty."

Now if a demineralising process is carried on in a conventional electrodialytic cell hydrogen and hydroxyl ions are frequently produced from the water, particularly when the concentration of dissolved solids in the desalting compartments is reduced to 1000 parts per million (p.p.m.) or below. If cations which have insoluble hydroxides are present these hydroxides precipitate within the compartments. The precipitation occurs in the salty compartments and it may be prevented by dosing the salty stream with acid. In practice it is only possible by this means to reduce the concentration of dissolved solids to 500 p.p.m., as below this concentration the electrical resistance of the cell is so high that excessive amounts of power are needed. The electrical resistance may be reduced by filling the desalting compartments with mixed cation-exchange and anion-exchange materials, but it is then found that precipitation occurs in the filled compartments. Not only is it undesirable to introduce acid into the desalting compartments, but also acid introduced into these compartments merely exhausts the anion-exchange component of the mixture. Moreover, in cells having compartments filled with ion-exchange materials, there is much greater production of hydrogen and hydroxyl ions than in conventional cells, and accordingly increased tendency to the formation of scale by precipitation.

By the application of the invention to a demineralising process, water containing 500 p.p.m. or less of dissolved solids, for example 50 p.p.m., can be produced without excessive power consumption and the formation of scale in the desalting compartments can be largely eliminated. The water first flows through a desalting compartment containing a cation-exchange material charged with hydrogen ions. The water becomes acid and there is thus no tendency to scale. The salty compartments become correspondingly alkaline and scale therefore tends to form here. However, this may be avoided by dosing these compartments with acid to maintain a low pH. The water next flows through a desalting compartment filled with anion-exchange material. Here, alkali is formed, but the majority of this alkali is neutralised, with the formation of water, by the acid already formed. If there should remain a little unneutralised alkali this will not cause scaling because there are virtually no scale-forming cations in the water, these having been removed in the first compartment. If desired, any small residual alkalinity can be neutralised by dosing with a little acid. In the salty compartments on either side of that filled with the anion-exchange material acid is formed and there is no tendency to precipitate scale.

The salty streams may be either some of the raw water or other aqueous solution being treated or dilute solutions of any convenient salt, e.g. sodium chloride. If desired, a single salty stream receiving ions first from one desalting compartment and then from the other may be used.

The selectively permeable barriers are preferably ion-exchange membranes. The ion-exchange materials may be granules or they may be in the form of sheets arranged to allow free passage of liquid through the compartments. If sheets are used they may for example be perforated or consist of gauze or woven fabric carrying ion-exchange groups. The ion-exchange materials are preferably synthetic resins, the cation-exchange resin containing strongly acidic, and the anion-exchange resin strongly basic, ion-exchange groups.

The electrode compartments at the end of each cell must, of course, always contain an electrolyte to maintain the electrical continuity of the cell. They may also contain ion-exchange material of either or both types in order to reduce the electrical resistance of the cell. Likewise the salty compartments may contain ion-exchange material. The presence of this material is however only useful if it leads to higher conductivity than is given by the electrolyte alone in the electrode and desalting compartments.

In carrying out the invention multi-compartment cells are preferably used, i.e. cells having two or more desalting compartments, for example 30 or more such compartments, and in such cells the compartments containing cation-exchange material and that containing anion-exchange material will each be one of a group of similar compartments, the two groups being connected in series. Numerous arrangements of the compartments are possible.

By way of example, the use of the invention in the demineralisation of water will now be described in detail with reference to the accompanying drawings, in which:

Figure 1 is a sectional elevation through two electrodialytic cells connected in series;

Figures 2 and 3 are sections on the lines II—II and III—III respectively in Figure 1;

Figure 4 shows diagrammatically the way in which the solutions flow through the apparatus shown in Figure 1, and Figures 5 and 6 show other possible arrangements of the flow.

Figure 5:
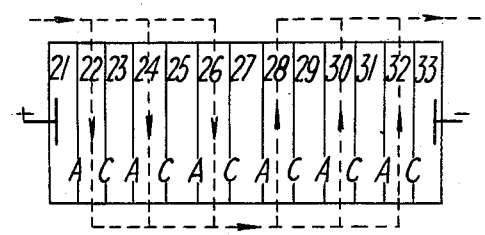

The units 1 and 2 in Figure 1 are two structurally identical electrodialysis cells, each mounted vertically with the anode at the bottom and the cathode at the top. Each cell consisted of a pack of 36 anion-selective membranes A and 36 cation-selective membranes C arranged alternately between end pieces 3 which carried carbon electrodes 4. The membranes were of the heterogeneous type, the anion-selective membranes being those known as Permaplex A-20 and comprising quaternary ammonium groups as the ion-exchange groups and the cation-selective membranes being those known as Permaplex C-20 and comprising sulphonic acid groups as the ion-exchange groups. The membranes were separated from one another and from the end pieces 3 by 1/8 inch thick gaskets 5 formed of plasticised polyvinyl chloride in the form of square frames with open centres 20 inches square, each pair of membranes and the intervening gasket defining a compartment of the cell and the end membranes and end pieces 3 defining the electrode compartments. The component parts of the pack were located by insulated rods (not shown in Figure 1) passing through holes 6 in the borders of the gaskets and in the membranes, and each pack was further held in a frame consisting of rigid plates 7 at each end held together by four bolts 8.

The gaskets 5 are shown in plan in Figures 2 and 3, and were structurally identical. In the border of each were punched four rectangular holes 9, 10, 11 and 12, which registered with one another and with corresponding holes in the membranes so as to form channel-ways extending the whole depth of the pack. On opposite sides of each membrane these holes were extended so as to form rectangular passages joining the channel-ways and the central space of the gasket, and in each of these passages was inserted a spacer 13 which served to prevent the adjacent membranes from bulging into the passages while allowing free passage of liquid between the channel-way and the central space. Liquid could thus flow across each compartment from one side to the opposite side as indicated by the arrows in Figures 2 and 3. Alternate gaskets were arranged at right-angles to one another so that the directions of flow in alternate compartments were at right-angles.

In both cells the electrode compartments and the compartments bounded on the anode side by a cation-permeable membrane were filled with a coarse woven mesh 17 of polyvinyl chloride to space the membranes apart, and the remaining compartments were filled with granular ion-exchange resin. In cell 1 this consisted of Zeo-Karb 225, a strongly acidic cation-exchange resin containing sulphonic acid groups, and in cell 2 of De-Acidite FF, a strongly basic anion-exchange resin.

Water to be demineralised was fed into the cell 1 through the pipe 14 and thence into channel-way 11, from which it flowed in parallel streams across the resin-filled compartments to channel-way 12 and thence through the pipe 15 into the channel-way 12' in the cell 2, where it flowed in parallel streams across the compartments filled with anion-exchange resin to the channel-way 11' and out via the pipe 16. Simultaneously a stream of rinsing water was fed in countercurrent through the remaining compartments of each cell and formed the salty stream, the supplies to the two cells being separate and being recycled as shown in Figure 4. The four electrode compartments were connected in series and fed with a separate circulating stream of water, from which a portion was bled off and replenished with raw water to maintain a suitable electrolyte concentration.

In one experiment the water to be demineralised was London tap-water of the following composition:

|  | P.p.m. |
|---|---|
| Hardness (as $CaCO_3$) | 280 |
| Sodium (as Na) | 20 |
| Theoretical mineral acidity (as $CaCO_3$) | 108 |
| Bicarbonate alkalinity (as $CaCO_3$) | 225 |

This water was supplied to the desalting compartments at 16 imperial gals./hr. The same water was initially supplied to the salty compartments and was circulated through them at the same rate and then recycled so that only 1 imperial gal./hr. emerged from the cell and was sent to waste, this being made up with the tap water. Sulphuric acid was injected into the recycling stream at the rate of 25 gms./hr. A potential of 180 volts D.C. was applied to the electrodes of cell 1, the current flowing being 3.5 amps. The desalted water emerging from this cell had the composition:

|  | P.p.m. |
|---|---|
| Hardness | Less than 5 |
| Sodium | Unmeasurable |
| Free mineral acidity | 108 |
| Free $CO_2$ | 195 |

The cell 2 was fed with the desalted effluent from the first cell, the desalting stream flowing at 15 gal./hr. and the salty stream flowing at the same rate, and being recycled as before so that only 1 gal./hr. emerged from the cell and went to waste, being replaced by fresh tap water. No acid was injected into this stream. A potential of 90 volts was applied to the electrodes, the current flowing being 1.7 amps. The desalted water emerging from this second cell had the following characteristics:

| Hardness | Less than 5 p.p.m. |
|---|---|
| Free $CO_2$ | 190 p.p.m. |
| pH | 5 p.p.m. |
| Conductivity | 15 micromhos/cm. |
| Sodium, chloride and sulphate | Unmeasurable. |

After having run for 200 hours both cells were dismantled. No scale was found in either of them.

Instead of the groups of compartments filled with cation-exchange and with anion-exchange materials being in separate cells, the two cells may be combined into a single cell in which all the compartments are arranged between two end electrodes, the desalting compartments in one half of the cell being filled with one exchange material and those in the other half with the other exchange material. Such an arrangement is shown diagrammatically in Figure 5, in which the compartments 22, 24 and 26 are filled with cation-exchange material and the compartments 28, 30 and 32 with anion-exchange material. The odd-numbered compartments are the salty compartments, the flow of the rinsing solution through them being omitted for simplicity.

Figure 6:
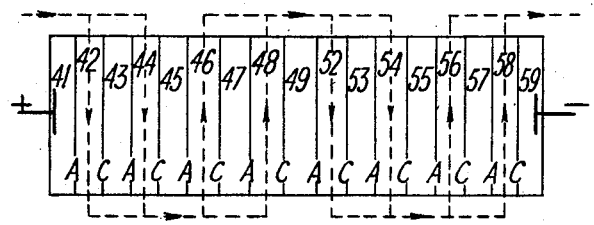

In the arrangements so far described the water or other solution flows through all the desalting compartments in each cell or each half of the cell wholly in parallel streams. If there are a large number of compartments the groups may be divided into sub-groups of compartments connected in parallel, the sub-groups within each group being themselves arranged in series. Such an arrangement is shown diagrammatically in Figure 6, the flows through the salty compartments again being omitted for simplicity. In this figure the compartments 42, 44, 46 and 48 contain cation-exchange material and the compartments 52, 54, 56 and 58 contain anion-exchange material.

Whatever the arrangement of flows through the desalting compartments, the flows through the salty compartments are most conveniently, but not necessarily, similar to those through the desalting compartments.

It will be appreciated that while it is possible to effect demineralisation by passing an aqueous solution first through a desalting compartment filled with an anion-exchange material and then through one filled with a cation-exchange material, this may lead to the formation of large quantities of precipitate and scale in the first desalting compartment owing to the accumulation of hydroxyl ions in the presence of cations of metals, e.g. calcium and magnesium, which form insoluble hydroxides and carbonates. By means of the invention this is avoided, as the solution entering the compartments filled with anion-exchange material is already sufficiently acid to neutralise the hydroxyl ions immediately they are formed, and convert them into water.

I claim:

1. A process for removing dissolved ionically dissociated solid from an aqueous solution which comprises subjecting the solution to electrodialysis successively in two compartments each lying between a cathode and an anode in an electrodialytic cell and each bounded on the cathode side by a barrier selectively permeable to cations and on the anode side by a barrier selectively permeable to anions, the first compartment being filled with a cation-exchange material, the second compartment being filled with an anion-exchange material and each compartment lying between and adjacent to two others containing an aqueous electrolyte.

2. A process according to claim 1 in which the ion-exchange materials are synthetic ion-exchange resins, the cation-exchange resin containing strongly acidic, and the anion-exchange resin strongly basic ion-exchange groups.

3. A process according to claim 1 in which the first compartment forms part of a first electrodialysis cell and the second compartment forms part of a second electrodialysis cell.

4. A process according to claim 1 in which the first and second compartments form part of a single electrodialysis cell.

5. A process according to claim 1 in which the first compartment is one of a first group of similar compartments, and the second compartment is one of a second group of similar compartments, the second group of compartments being connected in series with the first group.

6. A process according to claim 5 in which the compartments of at least one of the groups is connected in parallel.

7. A process according to claim 5 in which the compartments of at least one of the groups is divided into sub-groups of compartments connected in parallel, the sub-groups within each group being connected in series.

8. A process of demineralising water which comprises subjecting the water to electrodialysis successively in two compartments each lying between a cathode and an anode in an electrodialytic cell and each bounded on the cathode side by a barrier selectively permeable to cations and on the anode side by a barrier selectively permeable to anions, the first compartment being filled with a synthetic cation-exchange resin containing strongly acidic ion-exchange groups, the second compartment being filled with a synthetic anion-exchange resin containing strongly basic ion-exchange groups, and each compartment lying between and adjacent to two others containing an aqueous electrolyte, the electrolyte in the compartments adjacent to the first compartment being acidified.

9. A process according to claim 8 in which the first compartment is one of a first group of similar compartments, and the second compartment is one of a second group of similar compartments, the second group of compartments being connected in series with the first group.

References Cited in the file of this patent

UNITED STATES PATENTS

| | | |
|---|---|---|
| 2,694,680 | Katz et al. | Nov. 16, 1954 |
| 2,741,595 | Juda | Apr. 10, 1956 |
| 2,854,394 | Kollsman | Sept. 30, 1958 |